(12) United States Patent
Bingham et al.

(10) Patent No.: US 9,502,873 B2
(45) Date of Patent: Nov. 22, 2016

(54) COMPRESSOR AND ENCLOSURE ASSEMBLY FOR ELECTRICAL COMPONENTS

(75) Inventors: Larry L. Bingham, Greenville, OH (US); Kenneth J. Monnier, Maplewood, OH (US); Anne Dariene Powell, Springboro, OH (US); Stephen Shotaro Sakai, Terre Haute, IN (US); Matthew Paul Dunn, Terre Haute, IN (US); George A. Clark, Lewis Center, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 706 days.

(21) Appl. No.: 13/293,201

(22) Filed: Nov. 10, 2011

(65) Prior Publication Data

US 2012/0282124 A1 Nov. 8, 2012

Related U.S. Application Data

(60) Provisional application No. 61/412,192, filed on Nov. 10, 2010.

(51) Int. Cl.
*H02G 3/08* (2006.01)
*F01C 21/10* (2006.01)
(Continued)

(52) U.S. Cl.
CPC ............... *H02G 3/088* (2013.01); *F01C 21/10* (2013.01); *F04C 23/008* (2013.01); *F04C 18/0215* (2013.01); *F04C 2240/803* (2013.01); *F04C 2240/808* (2013.01); *H01R 13/60* (2013.01); *H01R 13/62* (2013.01)

(58) Field of Classification Search
CPC .................... H02G 3/088; F04C 23/008; F04C 2240/803; F04C 2240/808
USPC ....... 417/410.1, 410.3, 410.4, 410.5, 423.14, 417/366; 439/278, 680, 685
See application file for complete search history.

(56) References Cited

U.S. PATENT DOCUMENTS 4,573,880 A * 3/1986 Hirano .................. F04B 39/121
181/403
5,584,716 A * 12/1996 Bergman ........... H01R 13/5202
174/152 GM
(Continued)

FOREIGN PATENT DOCUMENTS

CN 1830131 A 9/2006
CN 1926738 A 3/2007
(Continued)

OTHER PUBLICATIONS

International Search Report regarding Application No. PCT/US2011/060135, dated Apr. 10, 2012.
(Continued)

*Primary Examiner* — Dominick L Plakkoottam
(74) *Attorney, Agent, or Firm* — Harness, Dickey & Pierce, P.L.C.

(57) ABSTRACT

A compressor electrical component enclosure may include a base and a lid. The base may include first and second opposing surfaces and a magnet. The magnet may be coupled to the second surface and may secure the base to a compressor shell. The lid may engage the base and cooperate with the base to define an electrical component housing.

22 Claims, 13 Drawing Sheets

(51) Int. Cl.
*F04C 23/00* (2006.01)
*H01R 13/62* (2006.01)
*H01R 13/60* (2006.01)
*F04C 18/02* (2006.01)

(56) References Cited

U.S. PATENT DOCUMENTS

| | | | | |
|---|---|---|---|---|
| 5,769,659 | A * | 6/1998 | Ceylan | H02G 3/088 |
| | | | | 439/521 |
| 6,916,210 | B2 * | 7/2005 | Moore, Jr. | H01R 13/5216 |
| | | | | 439/362 |
| 7,141,738 | B2 | 11/2006 | Marsac et al. | |
| 7,225,959 | B2 * | 6/2007 | Patton | B25C 1/04 |
| | | | | 173/217 |
| 7,935,888 | B2 * | 5/2011 | Hansen | H02K 5/225 |
| | | | | 174/66 |
| 8,721,371 | B2 * | 5/2014 | Picker | H01R 13/58 |
| | | | | 429/468 |
| 8,939,735 | B2 * | 1/2015 | Heidecker | F04B 39/121 |
| | | | | 310/71 |
| 2003/0190835 | A1 * | 10/2003 | Hawkes | H02G 15/04 |
| | | | | 439/454 |
| 2005/0196285 | A1 * | 9/2005 | Jayanth | F04C 23/008 |
| | | | | 417/44.11 |
| 2009/0251033 | A1 * | 10/2009 | Helms | H02B 1/40 |
| | | | | 312/246 |

FOREIGN PATENT DOCUMENTS

| | | |
|---|---|---|
| CN | 200959411 Y | 10/2007 |
| JP | 2005-307798 A | 11/2005 |
| WO | WO-2010111492 A2 | 9/2010 |

OTHER PUBLICATIONS

Written Opinion of the International Searching Authority regarding Application No. PCT/US2011/060135, dated Apr. 10, 2012.
Office Action regarding Russia Application No. 2013125314 dated Jun. 10, 2014. Translation provided by Gowlings International Inc.
First Chinese Office Action regarding Application No. 201180054123.8, dated Feb. 4, 2015. Translation provided by Unitalen Attorneys at Law.
Office Action regarding Chinese Patent Application No. 201180054123.8, dated Oct. 10, 2015. Translation provided by Unitalen Attorneys at Law.

* cited by examiner

COMPRESSOR AND ENCLOSURE ASSEMBLY FOR ELECTRICAL COMPONENTS

CROSS-REFERENCE TO RELATED APPLICATIONS

This application claims the benefit of U.S. Provisional Application No. 61/412,192 filed on Nov. 10, 2010. The disclosure of the above application is incorporated herein by reference.

FIELD

The present disclosure relates to a compressor and an enclosure for electrical components associated with the compressor.

BACKGROUND

This section provides background information related to the present disclosure which is not necessarily prior art.

Heat-pump systems, refrigeration systems and other working fluid circulation systems include a fluid circuit having an outdoor heat exchanger, an indoor heat exchanger, an expansion device disposed between the indoor and outdoor heat exchangers, and a compressor circulating a working fluid (e.g., refrigerant or carbon dioxide) between the indoor and outdoor heat exchangers. Efficient and reliable operation of the compressor is desirable to ensure that the heat-pump system in which the compressor is installed is capable of effectively and efficiently providing a cooling and/or heating effect on demand.

SUMMARY

This section provides a general summary of the disclosure, and is not a comprehensive disclosure of its full scope or all of its features.

In one form, the present disclosure provides a compressor electrical component enclosure that may include a base and a lid. The base may include first and second opposing surfaces and a magnet. The magnet may be coupled to the second surface and may secure the base to a compressor shell. The lid may engage the base and cooperate with the base to define an electrical component housing.

In some embodiments, the compressor electrical component enclosure may include an electrical component disposed within the electrical component housing. The compressor electrical component enclosure may include a potting material at least partially coating the electrical component. The electrical component may include a current transducer and an indicator light extending through an aperture in the lid.

In some embodiments, the lid may include a latch removably engaging the base and a wire guide disposed on an outer surface thereof.

In some embodiments, the compressor may include a terminal block and a fence at least partially surrounding the terminal block. The terminal block and the fence may engage an aperture in the base.

In some embodiments, the compressor electrical component enclosure may include a first wire in communication with the compressor and may extend through a opening in the lid. In some embodiments, the compressor electrical component enclosure may include a tubular member engaging the opening in the lid. The wire may extend through the tubular member.

In another form, the present disclosure provides a compressor electrical component enclosure including a first portion and a second portion defining an interior volume receiving an electrical component. The first portion may include a first wall defining a plurality of first grooves, and a second wall defining a plurality of second grooves. The second portion may include third and fourth walls. The third wall may define a plurality of third grooves cooperating with the first grooves to form a plurality of first apertures. The fourth wall may define a plurality of fourth grooves cooperating with the second grooves to form a plurality of second apertures. The first and second apertures may engage a plurality of wires extending through the interior volume.

In some embodiments, the first and second portions may be movable relative to each other between an open configuration and a closed configuration. One of the first and second portions may include a latch securing the first and second portions to each other in the closed configuration. The first and second portions may be integrally formed with each other and may define a hinge therebetween allowing relative pivotable motion between the first and second portions.

In some embodiments, the electrical component may include a current transducer. At least one of the plurality of wires may extend through the current transducer. A potting material may at least partially coat the electrical component.

In some embodiments, the compressor electrical component enclosure may include a polymeric layer at least partially coating the first and second portions and sealing the first and second portions in a closed configuration.

In some embodiments, the first and second portions may include an aperture receiving an indicator light extending from the electrical component.

In yet another form, the present disclosure provides a system that may include a compressor, a plurality of wires, an electrical component, and an enclosure. The compressor may include a shell, a compression mechanism disposed within the shell, a motor drivingly engaging the compression mechanism, and a terminal assembly extending outwardly from the shell and in communication with the motor. The plurality of wires may be disposed outside of the shell and may be in communication with the terminal assembly. The electrical component may be disposed outside of the shell and may interact with at least one of the wires. The enclosure may include a first portion and a second portion defining an interior volume receiving an electrical component. The first portion may include a first wall defining a plurality of first grooves, and a second wall defining a plurality of second grooves. The second portion may include third and fourth walls. The third wall may define a plurality of third grooves cooperating with the first grooves to form a plurality of first apertures. The fourth wall may define a plurality of fourth grooves cooperating with the second grooves to form a plurality of second apertures. The first and second apertures may engage a plurality of wires extending through the interior volume and the first and second apertures.

In some embodiments, the first and second portions of the enclosure may be movable relative to each other between an open configuration and a closed configuration. The enclosure may include a latch securing the first and second portions to each other in the closed configuration. The first and second portions may be integrally formed with each other and define a hinge therebetween allowing relative pivotable motion between the first and second portions.

In some embodiments, the electrical component may include a current transducer. At least one of the plurality of wires may extend through the current transducer. A potting material may at least partially coating the electrical component.

In some embodiments, a polymeric layer may at least partially coating the first and second portions and seal the first and second portions in a closed configuration.

In some embodiments, the enclosure may include an aperture receiving an indicator light extending from the electrical component.

In some embodiments, the plurality of wires may be in communication with a plug engaging the terminal assembly.

In yet another form, the present disclosure provides an apparatus that may include a terminal plug and an enclosure. The terminal plug may be in communication with a terminal block extending through a compressor shell and may transmit electrical current to a compressor motor. The electrical component enclosure may include a base and a lid defining a cavity therebetween. The base may be integrally formed with the terminal plug and may include a plurality of first grooves. The lid may be secured to the base and may include a plurality of second grooves that cooperate with the first grooves to engage a plurality of wires.

In some embodiments, the base may receive the electrical component and the lid may include a plurality of apertures providing visual access to the electrical component. In some embodiments, the electrical component may include a current transducer measuring a flow of current through one of the plurality of wires.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
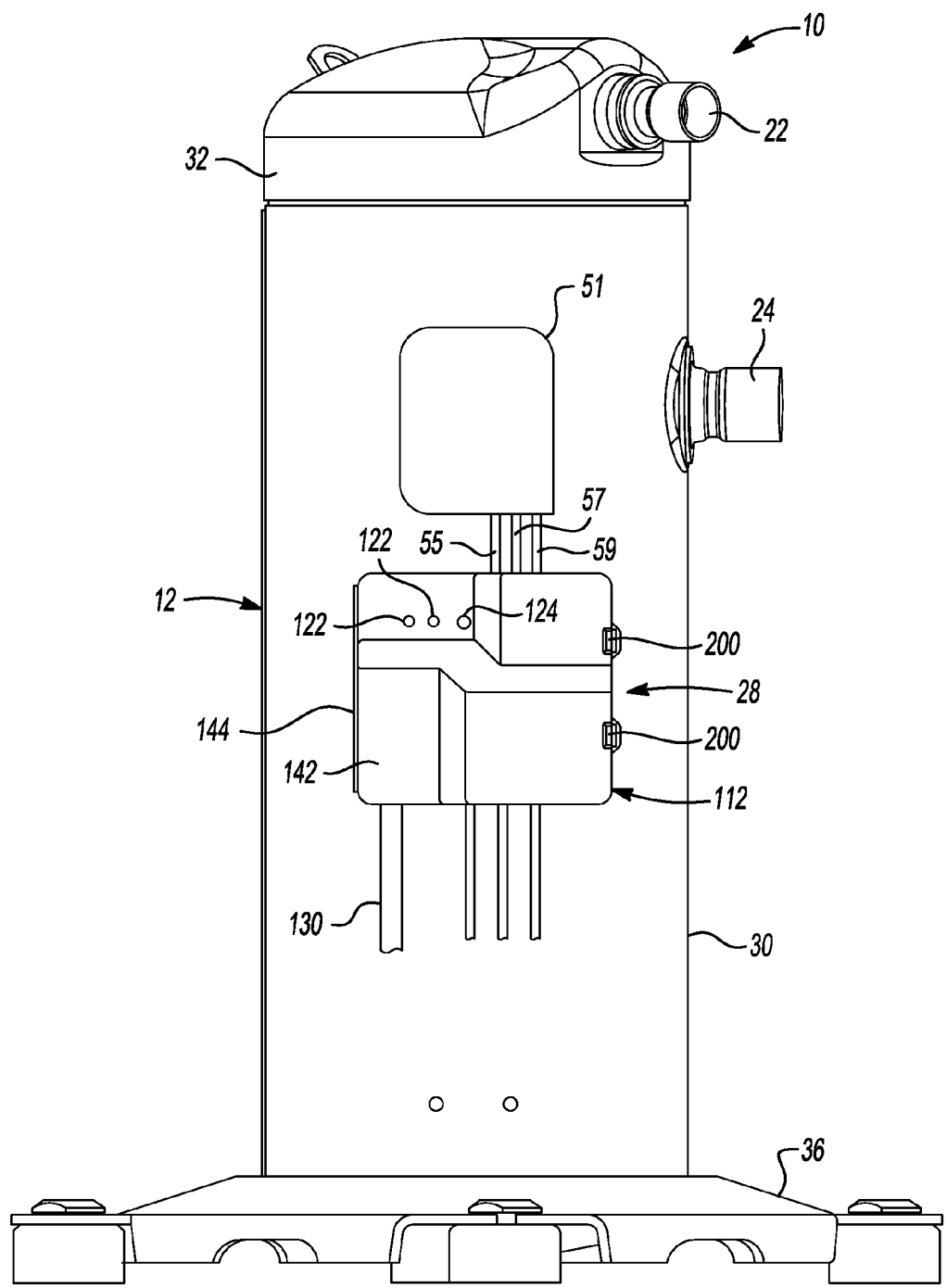
FIG. 1 is a plan view of a compressor including an enclosure for an electrical component according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
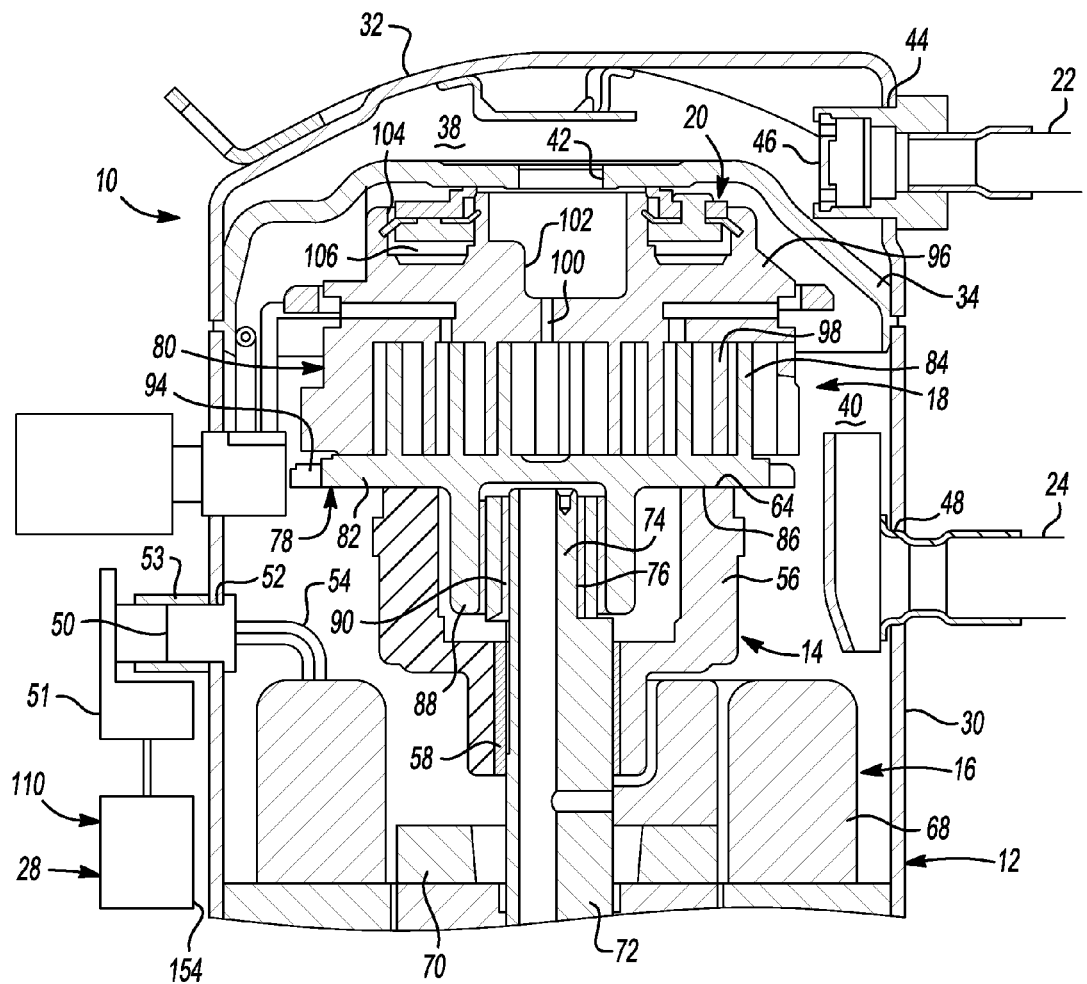
FIG. 2 is a partial cross-sectional view of the compressor of FIG. 1.
Figure 3:
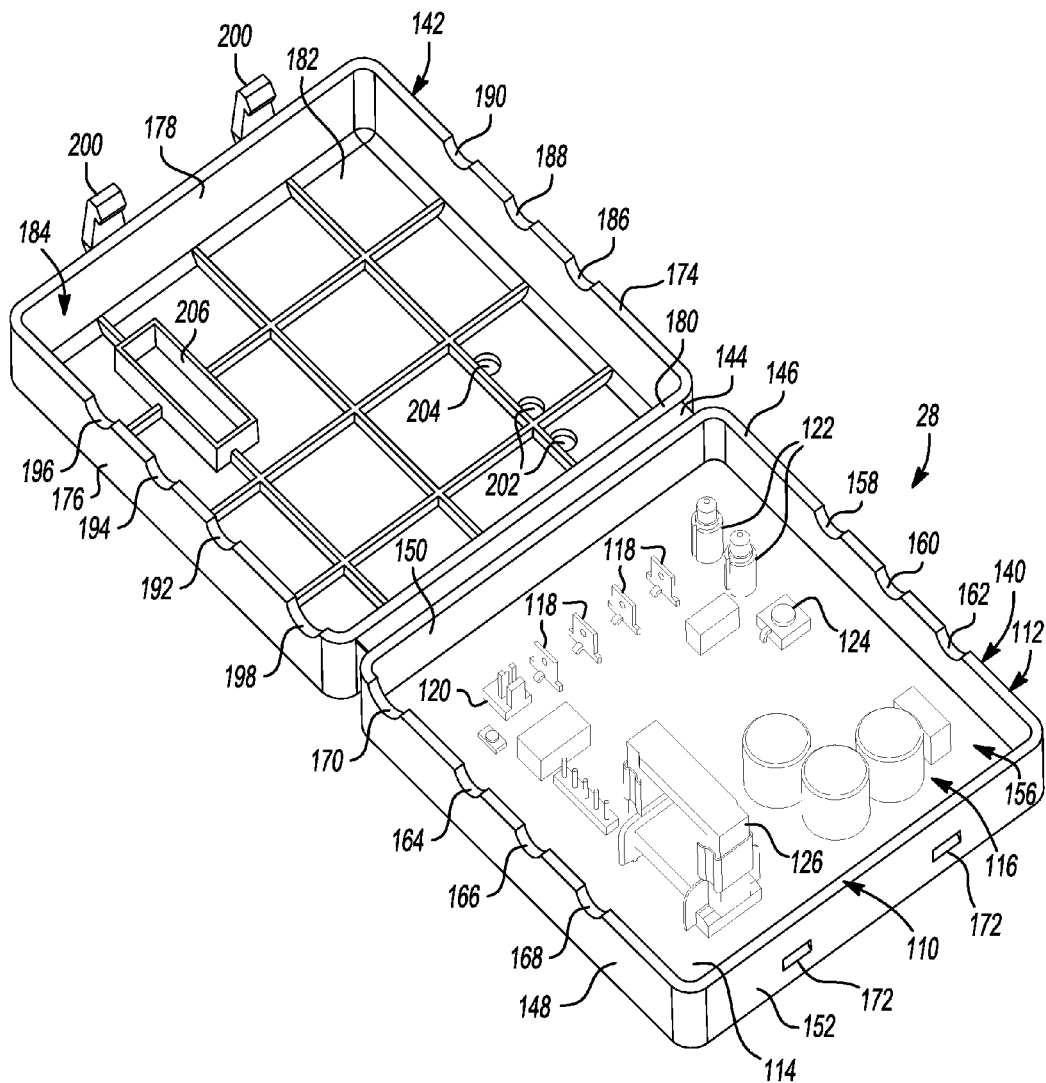
FIG. 3 is a perspective view of the enclosure in an open position.

With reference to FIGS. 1-3, a compressor 10 is provided and may include a hermetic shell assembly 12, a bearing housing assembly 14, a motor assembly 16, a compression mechanism 18, a seal assembly 20, a discharge fitting 22, a suction inlet fitting 24, and a diagnostic device 28. The shell assembly 12 may form a compressor housing and may include a cylindrical shell 30, an end cap 32 at an upper end thereof, a transversely extending partition 34, and a base 36 at a lower end thereof. The end cap 32 and the partition 34 may define a discharge chamber 38. The partition 34 may separate the discharge chamber 38 from a suction chamber 40. The partition 34 may include a discharge passage 42 extending therethrough to provide communication between the compression mechanism 18 and the discharge chamber 38. The discharge fitting 22 may be attached to shell assembly 12 at an opening 44 in the end cap 32. A discharge valve assembly 46 may be disposed within the discharge fitting 22 and may generally prevent a reverse flow condition. The suction inlet fitting 24 may be attached to shell assembly 12 at an opening 48.

A hermetic terminal block 50 may be attached to the shell assembly 12 at an opening 52. The terminal block 50 may be at least partially surrounded by a fence 53 (FIG. 5) extending outwardly from the shell 30. The terminal block 50 may facilitate communication with the motor assembly 16 through a plurality of wires 54. A terminal plug 51 may be electrically connected to a first lead wire 55, a second lead wire 57 and a third lead wire 59 and may be removably coupled with the terminal block 50 to allow communication between the wires 54 and the lead wires 55, 57, 59. The lead wires 55, 57, 59 may be connected to an electrical power source.

The bearing housing assembly 14 may be fixed relative to the shell 30 and may include a main bearing housing 56, a first bearing 58, sleeve guides or bushings (not shown), and fastener assemblies (not shown). The main bearing housing 56 may house the first bearing 58 therein and may define an annular flat thrust bearing surface 64 on an axial end surface thereof.

The motor assembly 16 may include a motor stator 68, a rotor 70, and a drive shaft 72. The motor stator 68 may be press fit into the shell 30. The rotor 70 may be press fit on the drive shaft 72 and may transmit rotational power to the drive shaft 72. The drive shaft 72 may be rotatably supported by the bearing housing assembly 14. The drive shaft 72 may include an eccentric crank pin 74 having a flat 76 thereon.

The compression mechanism 18 may include an orbiting scroll 78 and a non-orbiting scroll 80. The orbiting scroll 78 may include an end plate 82 having a spiral wrap 84 on an upper surface thereof and an annular flat thrust surface 86 on a lower surface. The thrust surface 86 may interface with the annular flat thrust bearing surface 64 on the main bearing housing 56. A cylindrical hub 88 may project downwardly from thrust surface 86 and may include a drive bushing 90 disposed therein. The drive bushing 90 may include an inner bore in which the crank pin 74 is drivingly disposed. The crank pin flat 76 may drivingly engage a flat surface in a portion of the inner bore to provide a radially compliant driving arrangement. An Oldham coupling 94 may be engaged with the orbiting and non-orbiting scrolls 78, 80 to prevent relative rotation therebetween.

The non-orbiting scroll 80 may include an end plate 96 and a spiral wrap 98 projecting downwardly from the end plate 96. The spiral wrap 98 may meshingly engage the spiral wrap 84 of the orbiting scroll 78, thereby creating a series of moving fluid pockets. The fluid pockets defined by the spiral wraps 84, 98 may decrease in volume as they move from a radially outer position (at a suction pressure) to a radially intermediate position (at an intermediate pressure) to a radially inner position (at a discharge pressure) throughout a compression cycle of the compression mechanism 18.

The end plate 96 may include a discharge passage 100, a discharge recess 102 and an annular recess 104. The discharge passage 100 is in communication with one of the fluid pockets at the radially innermost position and allows compressed working fluid (at the discharge pressure) to flow through the discharge recess 102 and into the discharge chamber 38. The annular recess 104 may encircle the discharge recess 102 and may receive the seal assembly 20. The annular recess 104 may cooperate with the seal assembly 20 to define an axial biasing chamber 106 therebetween. The biasing chamber 106 receives fluid at an intermediate pressure (less than a discharge pressure and greater than a suction pressure) from the fluid pocket in a radially intermediate position. A pressure differential between the intermediate-pressure fluid in the biasing chamber 106 and fluid in the suction chamber 40 exerts a net axial biasing force on the non-orbiting scroll 80 urging the non-orbiting scroll 80 toward the orbiting scroll 78. In this manner, the tips of the spiral wrap 98 of the non-orbiting scroll 80 are urged into sealing engagement with the end plate 82 of the orbiting scroll 78 and the end plate 96 of the non-orbiting scroll 80 is urged into sealing engagement with the tips of the spiral wrap 84 of the orbiting scroll 78.

The diagnostic device 28 may include a printed circuit board assembly 110 and an enclosure 112. The printed circuit board assembly 110 may be operable to diagnose a fault condition of the compressor 10 and/or a heat pump system or refrigeration system, for example, in which the compressor 10 may be incorporated. The printed circuit board assembly 110 may include a printed circuit board 114 and an electrical circuit 116. In some embodiments, the electrical circuit 116 may include a plurality of connection terminals 118, a communication port 120, one or more light-emitting diodes (LED's) 122, a reset button 124, a current transducer 126, a microprocessor, and/or other electrical components. The current transducer 126 can be or include a current transformer, for example, or any other current-measurement or current-sensing device. A potting material may be applied to the printed circuit board assembly 110 to secure and seal the connection terminals 118, communication port 120, LED's 122, reset button 124, current transducer 126 and/or other electrical components to the printed circuit board 114. The potting material may be a thermosetting polymer or other suitable material that seals and protects the printed circuit board assembly 110 from moisture, dust and/or other contaminants.

Each of a plurality of wires of a wire harness 130 may be connected to a corresponding one of the terminals 118 to provide communication between a corresponding one of a plurality of external electrical components and the electrical circuit 116. For example, the wire harness 130 may communicate electrical power from a power source to the diagnostic device 28, a demand signal from a thermostat to the diagnostic device 28, signals from one or more sensors to the diagnostic device 28, and/or signals to a controller of the compressor 10. The communication port 120 may facilitate communication between the diagnostic device 28 and an intelligent device such as a laptop or desktop computer, an Internet connection, a handheld device such as a smartphone or PDA (personal digital assistant), and/or any other computing device. One or more of the LED's 122 may provide a visual indication to warn or alert a user or technician that a fault condition exists in the compressor 10, for example. Another of the LED's 122 may indicate that the diagnostic device 28 is receiving electrical power and is operational. The user or technician may depress the reset button 124 to reset operation of the diagnostic device 28. One of the first, second and third wires 55, 57, 59 may extend through the current transducer 126. The current transducer 126 may measure the current flow through the one of the wires 55, 57, 59 to quantify a current drawn by the compressor 10, for example. The current transducer 126 may generate a signal indicative of the measured current and communicate the signal to the microprocessor and/or to the communication port 120.

The enclosure 112 may be formed from a polymeric material that is rated for use with wiring and/or electrical components by Underwriters Laboratories, Inc. (i.e., UL® rated material), for example. The enclosure 112 may include a first portion 140, a second portion 142 and a hinge portion 144. The first and second portions 140, 142 may cooperate to define a substantially enclosed interior volume therebetween. The first portion 140 may include opposing first and second walls 146, 148, opposing third and fourth walls 150, 152, and a base 154 (FIG. 2) cooperating to define a cavity 156. The first wall 146 may include first, second and third grooves 158, 160, 162. The second wall 148 may include first, second, third and fourth grooves 164, 166, 168, 170. The third wall 150 may be connected to or integrally formed with the hinge portion 144. The fourth wall 152 may include one or more apertures or latch catches 172. The printed circuit board assembly 110 may be received in the cavity 156 and retained therein by an interference fit therebetween, one or more fasteners, and/or an adhesive or the potting material described above.

The second portion 142 may include opposing first and second walls 174, 176, opposing third and fourth walls 178, 180, and a base 182 cooperating to define a cavity 184. The first wall 174 may include first, second and third grooves 186, 188, 190 that cooperate with the first, second, and third grooves 158, 160, 162 of the first potion 140, respectively, to form a plurality of first apertures engaging the first, second and third lead wires 55, 57, 59. The second wall 176 may include first, second, and third grooves 192, 194, 196 that cooperate with the first, second, and third grooves 164, 166, 168 of the first potion 140, respectively, to form a plurality of second apertures engaging the first, second and third lead wires 55, 57, 59. The engagement between the lead wires 55, 57, 59 and the corresponding grooves 158-168, 186-196 may be a friction fit, press fit or interference fit such that the first and second portions 140, 142 may grip the wires 55, 57, 59 to support the weight of the enclosure 112 and secure the enclosure 112 relative to the wires 55, 57, 59, as shown in FIG. 1. A user or technician may apply a force to the enclosure 112 to slide the enclosure 112 along the wires 55, 57, 59 to allow for variable positioning of the enclosure 112 along the wires 55, 57, 59 relative to the terminal plug 51.

The second wall 176 may also include a fourth groove 198 that may cooperate with the fourth groove 170 of the first portion 140 to define an aperture engaging the wire harness 130. The third wall 178 may include one or more latches 200 that removably engage the latch catches 172 in the first portion 140.

The fourth wall 180 may be connected to or integrally formed with the hinge portion 144. In this manner, the first and second portions 140, 142 may be pivotable between a closed position (FIG. 1) and an open position (FIG. 3). While in some embodiments, the hinge portion 144 may be integrally formed with the first and second portions 140, 142 to form a living hinge, in other embodiments, the hinge portion 144 may include any other type of hinge structure to allow the first and second portions 140, 142 to move between the open and closed positions.

The base 182 may include a plurality of first apertures 202, a second aperture 204, and a cavity 206. Each of the first apertures 202 may be aligned with a corresponding one of the LED's 122 such that the LED's 122 may be visible from outside of the enclosure 112 when the first and second portions 140, 142 are in the closed position. In some embodiments, the LED's 122 may extend through the first apertures 202 such that at the LED's 122 protrude out of the enclosure 112. The second aperture 204 may be substantially aligned with the reset button 124 of the printed circuit board assembly 110 when the first and second portions 140, 142 are in the closed position to allow the user or technician to depress the reset button 124 when the first and second portions 140, 142 are in the closed position. The cavity 206 may receive a distal end of the current transducer 126 when the first and second portions 140, 142 are in the closed position.

In some embodiments, the base 182 may include additional apertures that are aligned with the terminals 118 and/or the communication port 120 of the printed circuit board assembly 110 when the first and second portions 140, 142 are in the closed position. In such embodiments, the user or technician may connect or disconnect external electrical components to the printed circuit board assembly 110 without moving the enclosure 112 into the open position.

Figure 4:
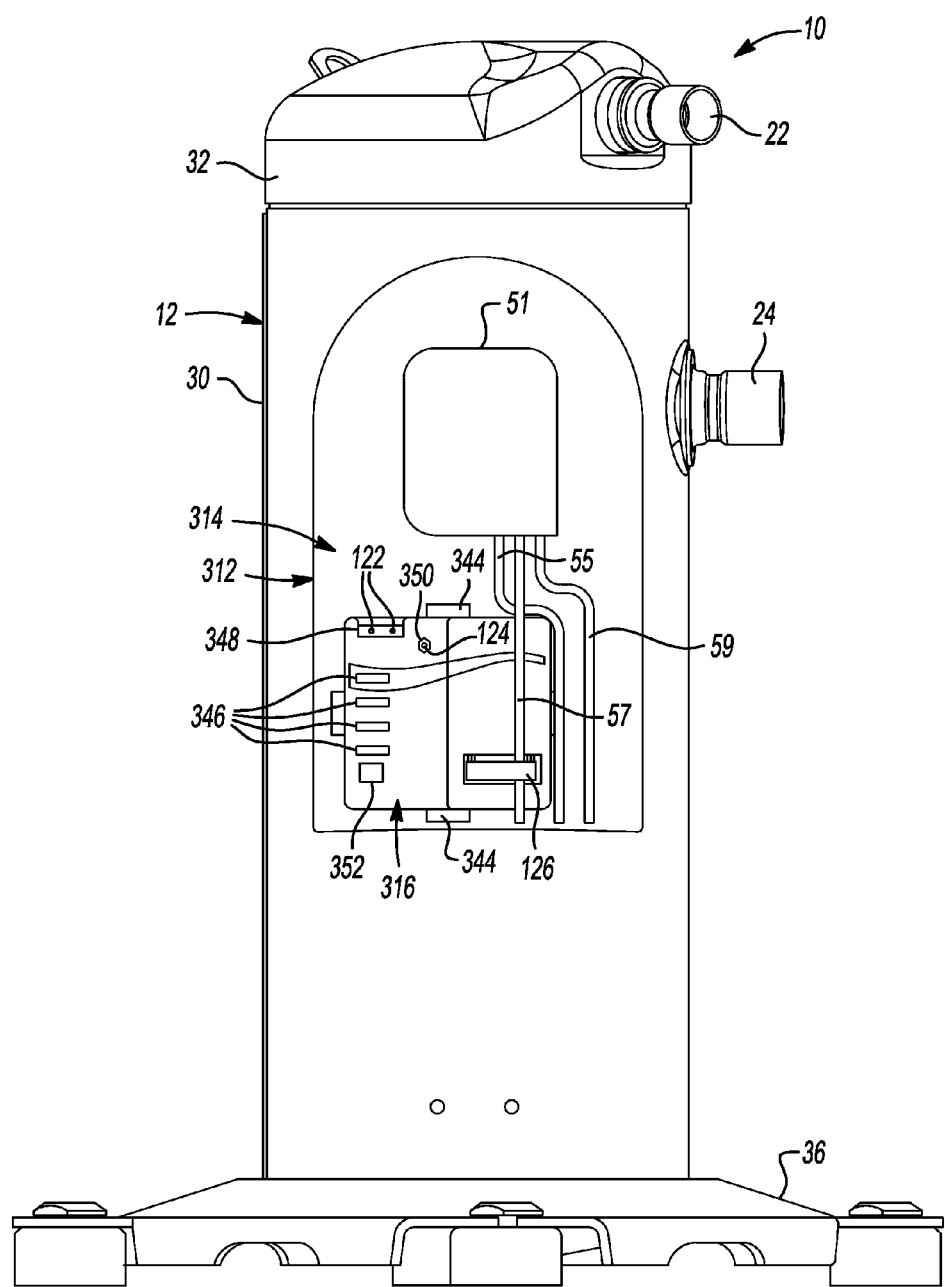
FIG. 4 is a plan view of the compressor and another enclosure according to the principles of the present disclosure.
Figure 5:
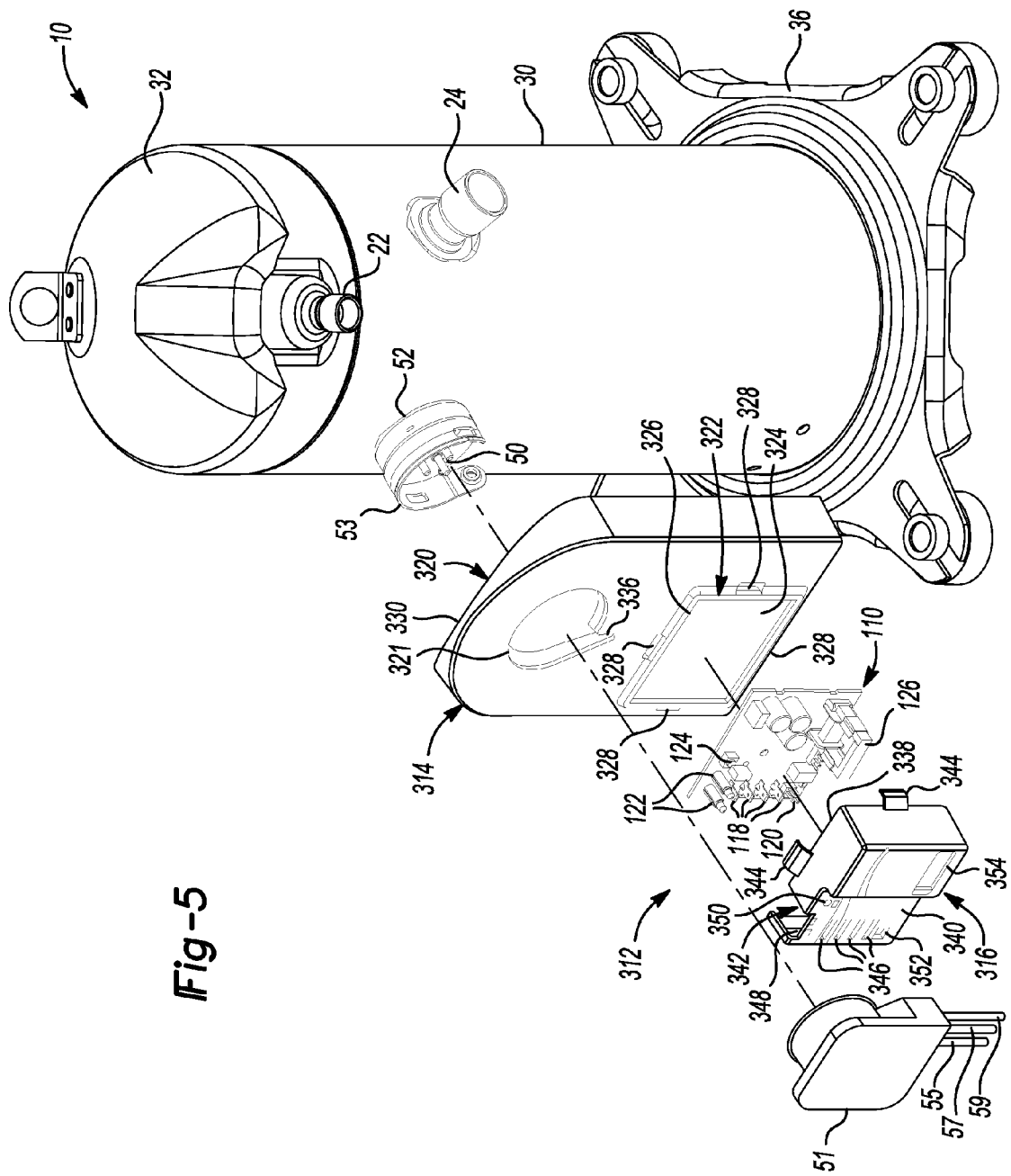
FIG. 5 is a partially exploded perspective view of the compressor and the enclosure of FIG. 4.
Figure 6:
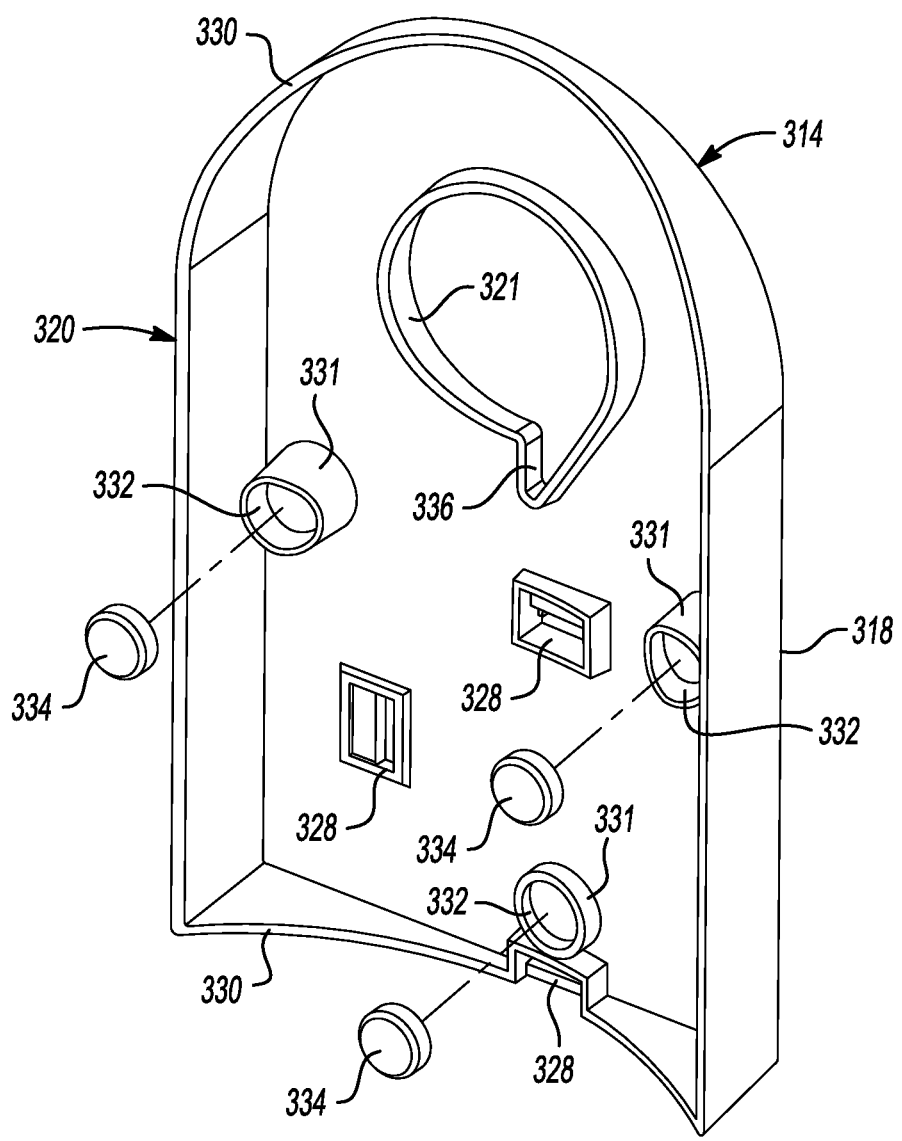
FIG. 6 is an exploded perspective view of the enclosure of FIG. 4 including a plurality of magnets.
Figure 7:
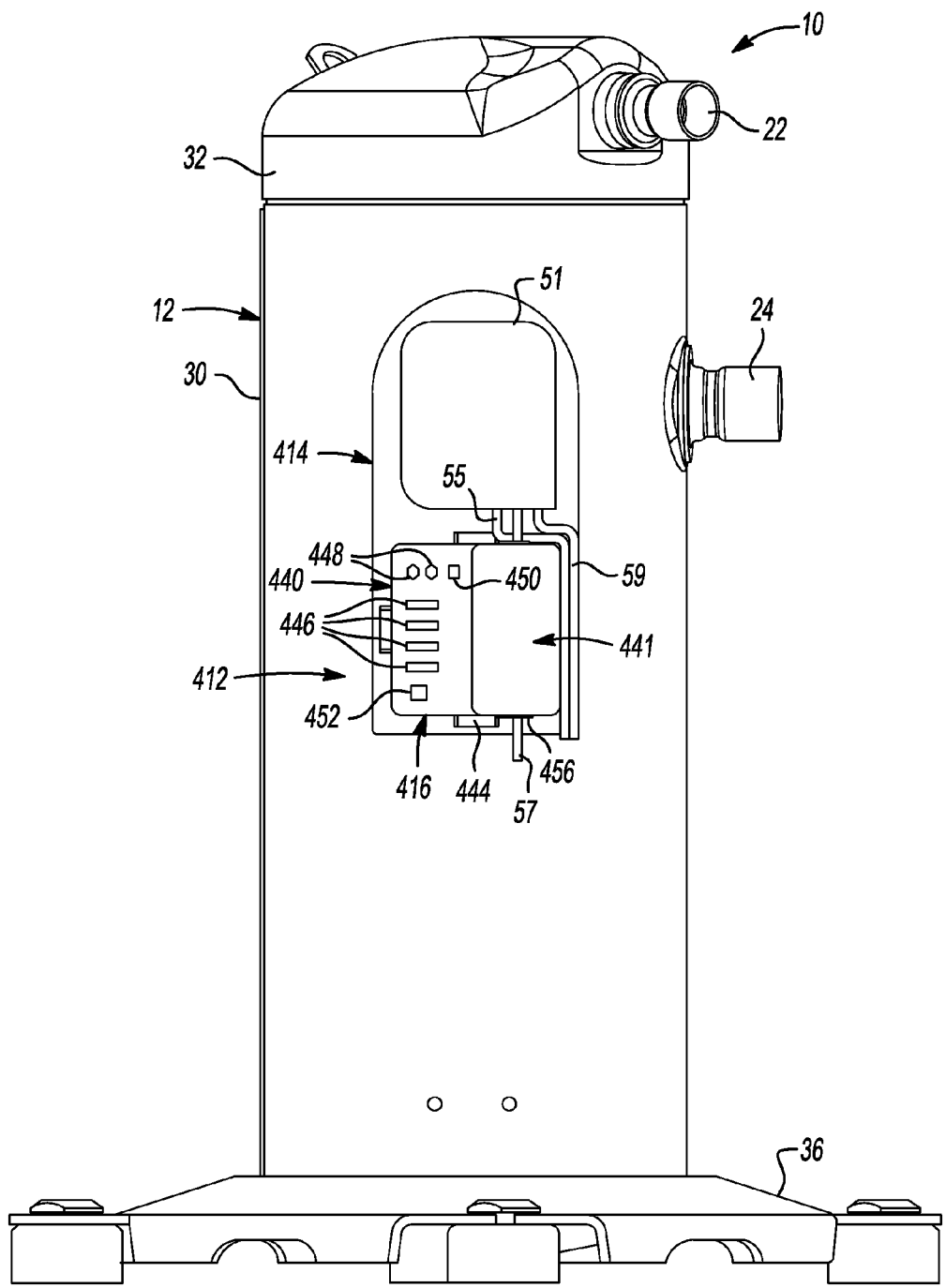
FIG. 7 is a plan view of the compressor and yet another enclosure according to the principles of the present disclosure.
Figure 8:
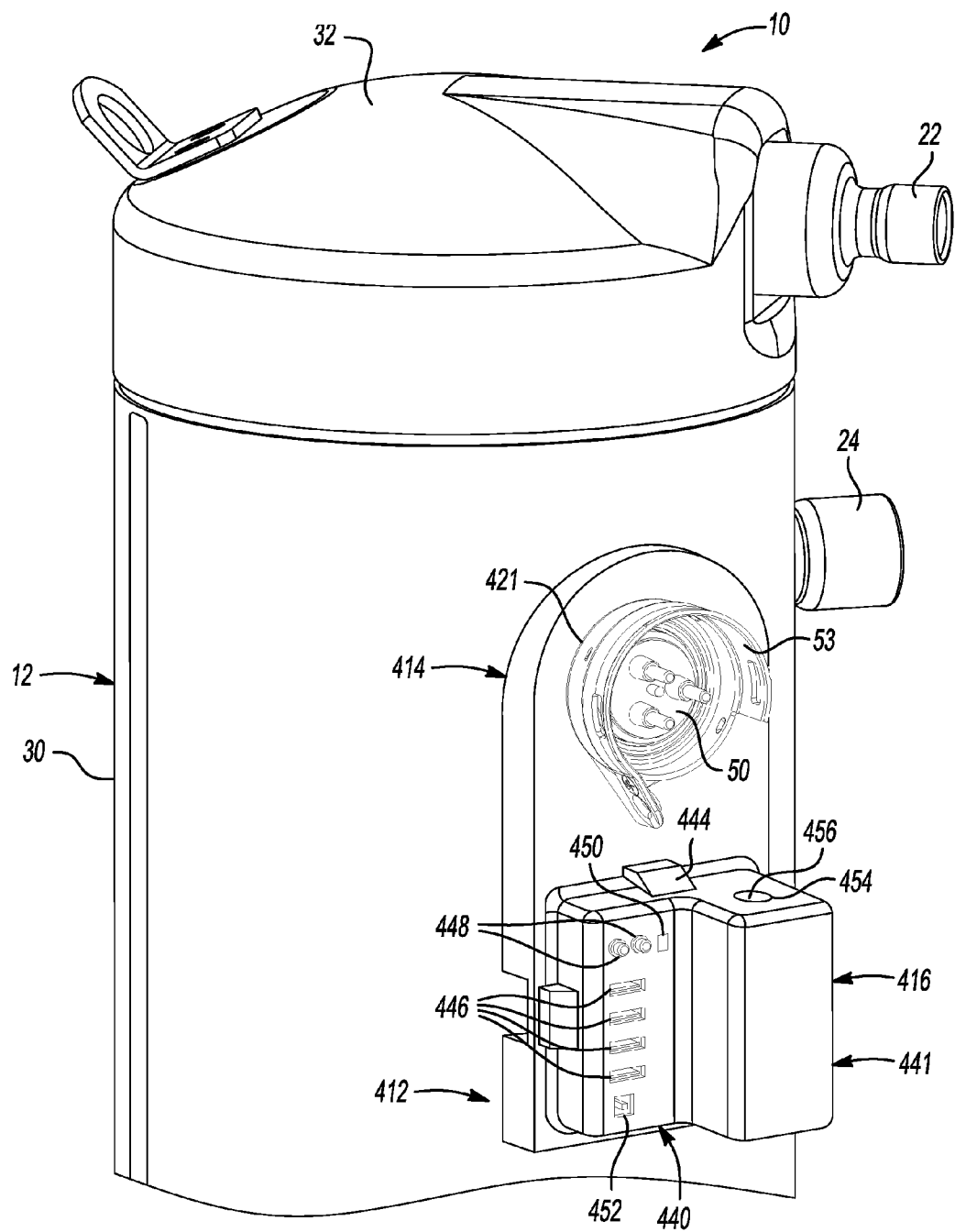
FIG. 8 is a partial perspective view of the compressor and enclosure of FIG. 7.
Figure 9:
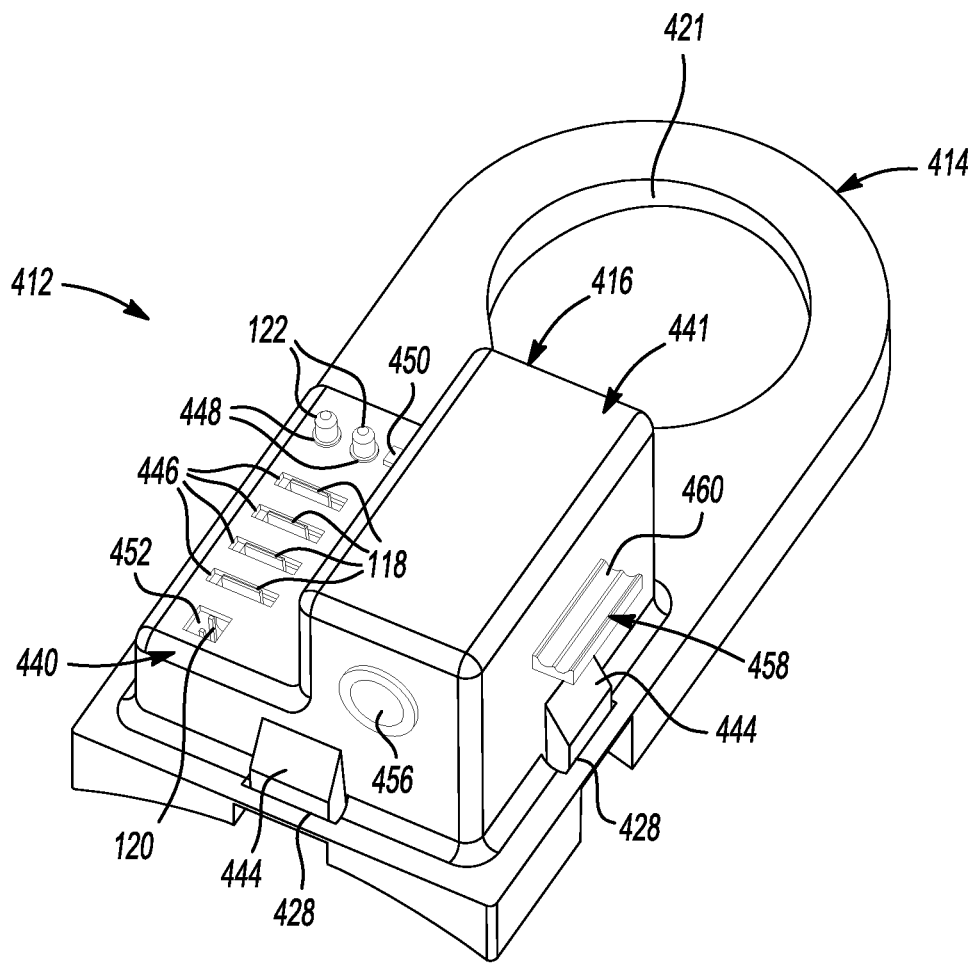
FIG. 9 is a perspective view of the enclosure of FIG. 7.
Figure 10:
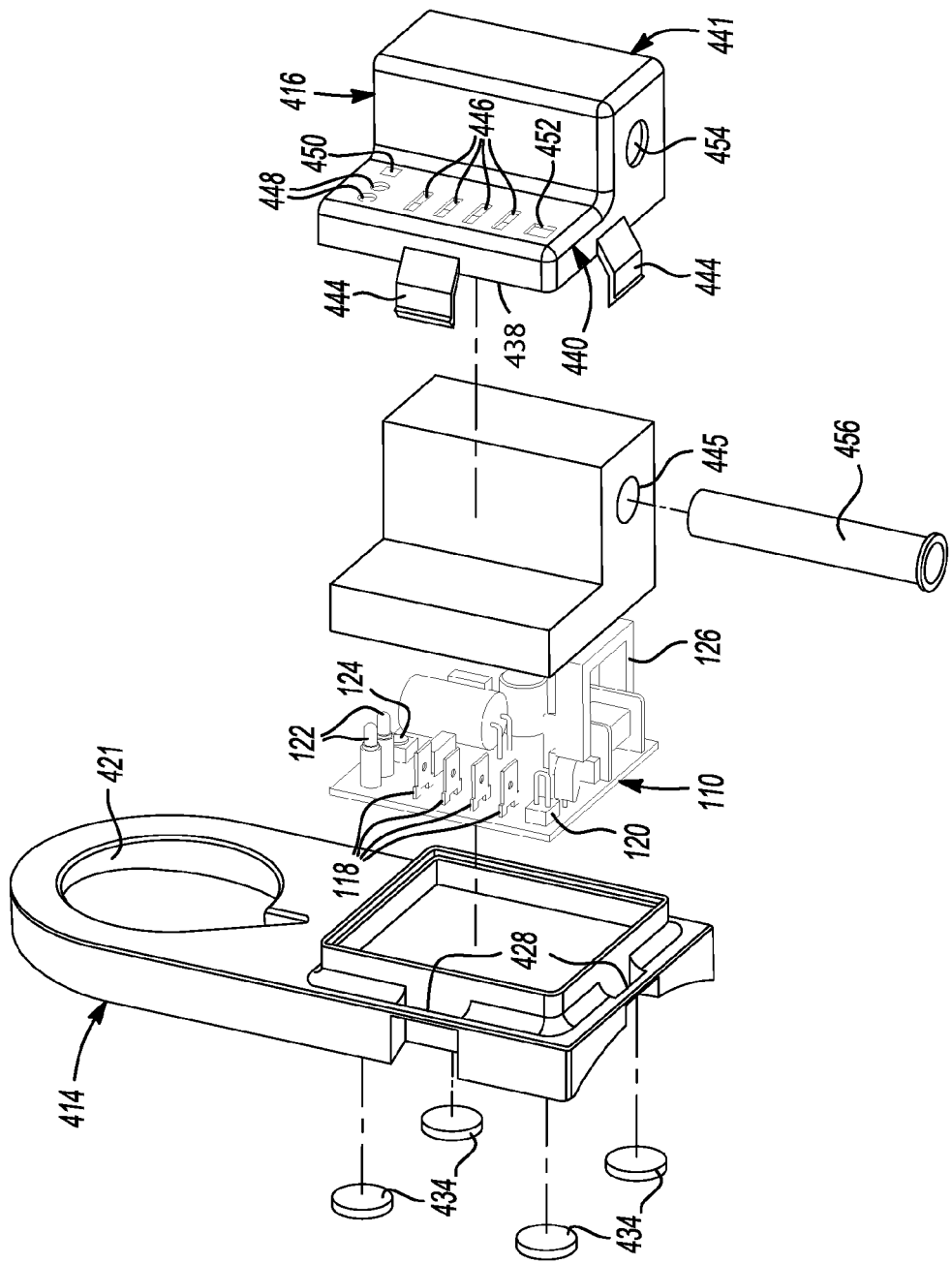
FIG. 10 is an exploded perspective view of the enclosure of FIG. 7 and an electrical component.

With reference to FIGS. 4-6, another enclosure 312 is provided that may house the printed circuit board assembly 110 or any other electrical component associated with the compressor 10. The enclosure 312 may be formed from a UL® rated polymeric material, for example, and may include a base 314 and a lid 316. The lid 316 may include first and second generally opposing sides 318, 320 and an aperture 321 extending therethrough. The first side 318 may be generally planar and may include a mounting surface 322. The mounting surface 322 may include a recess 324 defined by a raised rim 326. The rim 326 may include a plurality of latch catches 328. The printed circuit board assembly 110 may be received in the recess 324 and may be retained therein by an interference fit therebetween, one or more fasteners, and/or an adhesive or the potting material described above.

The second side 320 may include a pair of curved surfaces 330 that curve toward the first side 318 at a radius of curvature that may be substantially equal to a radius of the shell 30 of the compressor 10. The second side 320 may also include one or more posts 331 having recesses 332 that may receive one or more magnets 334. The magnets 334 may be adhesively bonded in the recesses 332 or the magnets 334 may engage the recesses 332 via a snap fit, for example.

The aperture 321 may be generally circular and may include a cutout 336 to form a shape corresponding to the shape of the fence 53 surrounding the terminal block 50. The aperture 321 may engage the fence 53 such that the base 314 may hang from the fence 53. The magnets 334 may be attracted to the metallic material of the shell 30 and may produce a magnetic force urging the enclosure 312 against the shell 30.

The lid 316 may include a generally hollow body having an open end 338 and a closed end 340 defining a cavity 342. A plurality of latches 344 may extend from the open end 338 and may removably engage the latch catches 328 formed in the base 314 by a snap fit. In this manner, the lid 316 and the base 314 may cooperate to substantially enclose the printed circuit board assembly 110. A potting material may fill some or all of the cavity 342 between the closed end 340 and the printed circuit board 114.

The closed end 340 may include a plurality of first apertures 346, a second aperture 348, a third aperture 350, a fourth aperture 352, and a fifth aperture 354. Each of the first apertures 346 may be aligned with a corresponding one of the terminals 118 of the printed circuit board assembly 110 to allow external electrical components to be electrically coupled to the terminals 118 without removing the lid 316 from the base 314. The second aperture 348 may extend through an upper portion of the closed end 340 and may be aligned with the LED's 122 to allow visual access to the LED's 122 while the lid 316 is engaged with the base 314. The second aperture 348 and corresponding one or more LED's 122 may be positioned such that the one or more LED's 122 are horizontally and vertically spaced apart from the terminal block 50 and terminal plug 51. In some embodiments, the LED's 122 may extend through the second aperture 348. In some embodiments, the lid 316 may include a plurality of apertures that are each aligned with a corresponding one of the LED's 122. The third aperture 350 may be aligned with the reset button 124 of the printed circuit board assembly 110 to allow the user or technician to depress the reset button 124 without removing the lid 316 from the base 314. The fourth aperture 352 may be aligned with the communication port 120 to allow the printed circuit board assembly 110 to be electrically coupled with the intelligent device without removing the lid 316 from the base 314. The fifth aperture 354 may receive the current transducer 126 to allow the current transducer 126 to extend through the lid 316. In this manner, one of the wires 55, 57, 59 may be routed through the current transducer 126 outside of the enclosure 312.

With reference to FIGS. 7-10, another enclosure 412 is provided that may house the printed circuit board assembly 110 or any other electrical component associated with the compressor 10. The enclosure 412 may be generally similar to the enclosure 312 described above, apart from any exceptions noted below. The enclosure 412 may include a base 414 and a lid 416. The base 414 may be substantially similar to the base 314, and therefore, will not be described again in detail. Briefly, the base 414 may include an aperture 421, a mounting surface 422 and a plurality of latch catches 428 that may be generally similar to the aperture 321, mounting surface 322 and latch catches 328, respectively. Magnets 434 may be attached to the base 414 and may urge the base 414 into contact with the shell 30.

The lid 416 may include a generally hollow body having a first portion 440 and a second portion 441 defining a cavity and an open end 438. The open end 438 may include a plurality of latches 444 that engage the latch catches 428 for a snap fit therebetween. In this manner, the lid 416 and the base 414 may cooperate to substantially enclose the printed circuit board assembly 110. A potting material 445 (shown schematically in FIG. 10) may fill some or all of the cavity between the printed circuit board 114 and the first and second portions 440, 441.

The first portion 440 may include plurality of first apertures 446, a plurality of second apertures 448, a third aperture 450, and a fourth aperture 452. Each of the first apertures 446 may be aligned with a corresponding one of the terminals 118 of the printed circuit board assembly 110 to allow external electrical components to be electrically coupled to the terminals 118 without removing the lid 416 from the base 414. Each of the second apertures 348 may be aligned with a corresponding one of the LED's 122 to allow visual access to the LED's 122 while the lid 416 is engaged with the base 414. In some embodiments, the LED's 122 may extend through the second apertures 448. The third aperture 450 may be aligned with the reset button 124 of the printed circuit board assembly 110 to allow the user or technician to depress the reset button 124 without removing the lid 416 from the base 414. The fourth aperture 452 may be aligned with the communication port 120 to allow the printed circuit board assembly 110 to be electrically coupled with the intelligent device without removing the lid 416 from the base 414.

The second portion 441 may include a fifth aperture 454 (FIG. 10) extending therethrough in a direction that is generally perpendicular to the apertures 446-452 in the first portion 440. A tube 456 may engage the fifth aperture 454 and extend through the current transducer 126. The tube 456 is installed into the fifth aperture 454 after the lid 416 is attached to the base 414. One of the wires 55, 57, 59 may extend through the tube 456, and hence the current transducer 126, to allow the current transducer 126 to measure a current flowing through the one of the wires 55, 57, 59. An outer surface of the second portion 441 may include a wire guide 458 having slots 460 that may engage another one or more of the wires 55, 57, 59.

Figure 11:
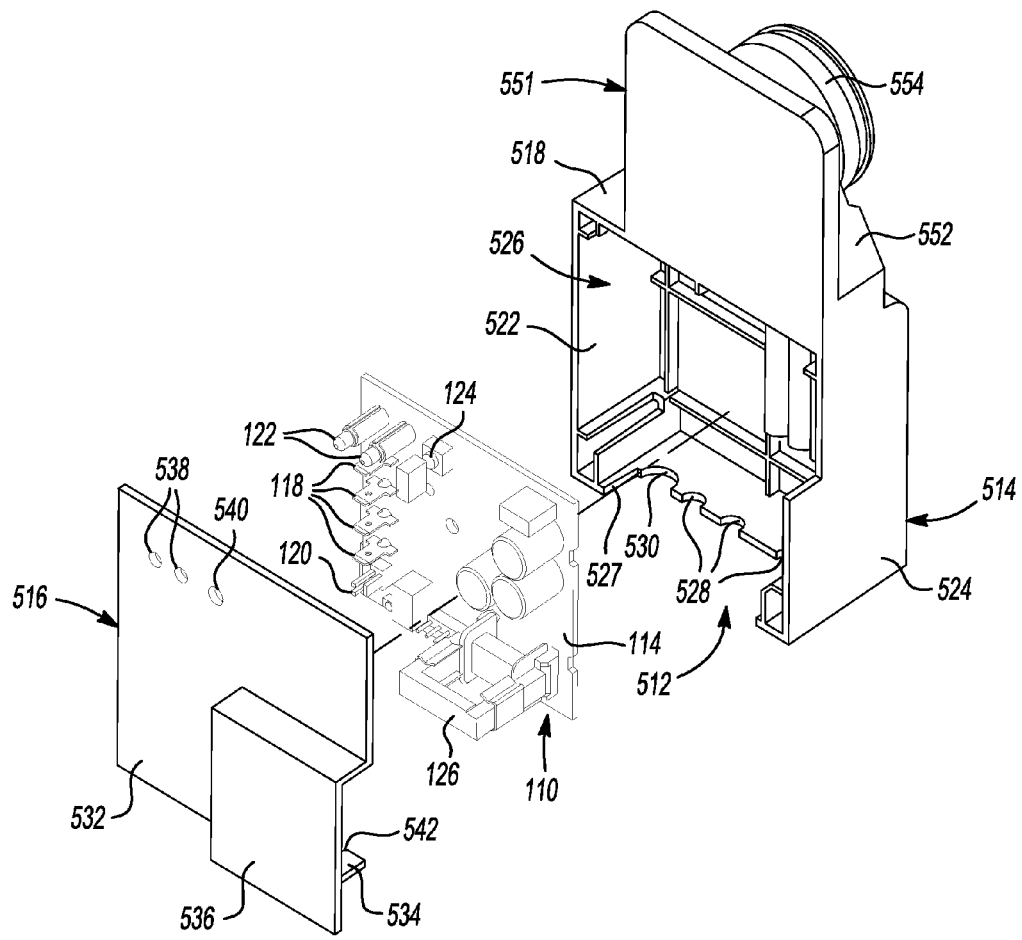
FIG. 11 is a partially exploded perspective view of still another enclosure according to the principles of the present disclosure.
Figure 12:
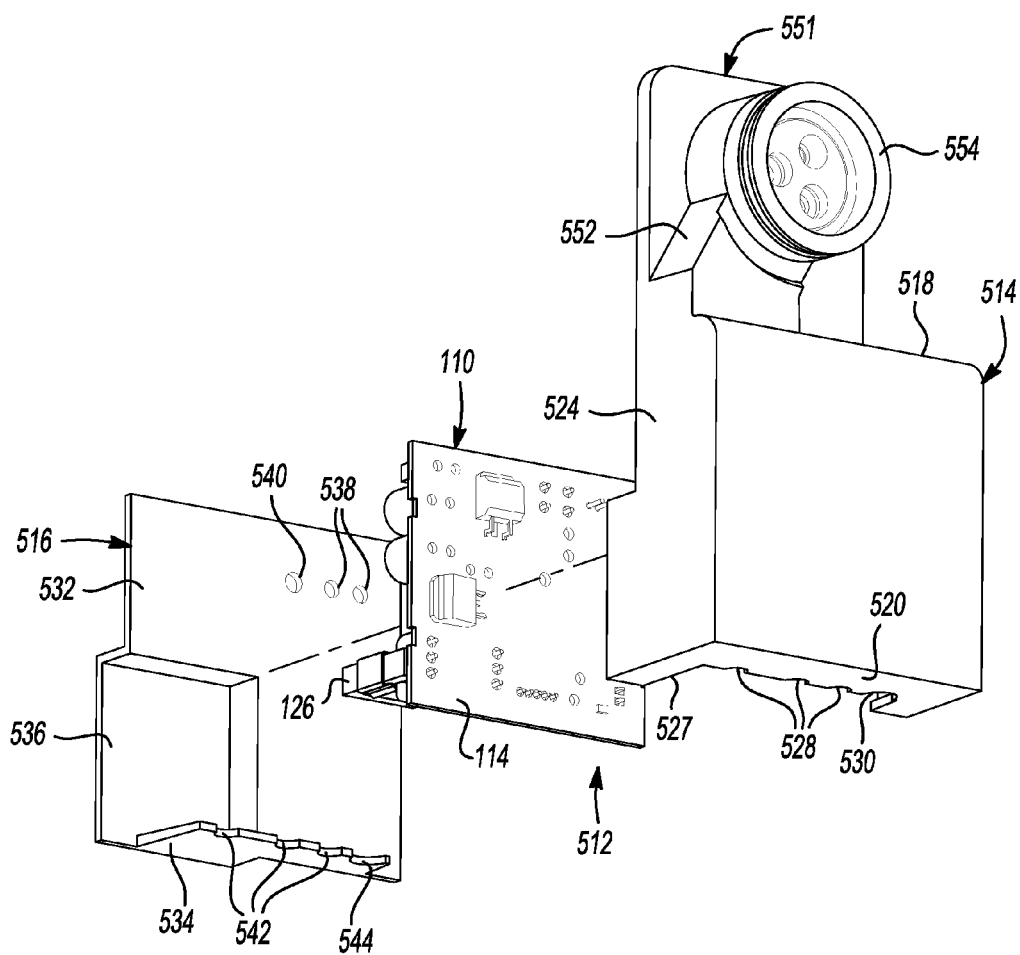
FIG. 12 is a perspective view of the enclosure of FIG. 11.

With reference to FIGS. 11 and 12, an integrally formed enclosure 512 and terminal plug 551 are provided. The enclosure 512 may house the printed circuit board assembly 110 or any other electrical component associated with the compressor 10. The enclosure 512 may include a base portion 514 and a lid 516. The base portion 514 may include first and second opposing walls 518, 520 and third and fourth opposing walls 522, 524 cooperating to define a cavity 526. The first wall 518 may be integrally formed with the terminal plug 551. The second wall 520 may include a cutout 527 having a plurality of first grooves 528 and a second groove 530 disposed therein. The printed circuit board assembly 110 may be received within the cavity 526 and be retained therein by a snap fit, threaded fasteners and/or an adhesive bond, for example.

The lid 516 may include a first portion 532, a second portion 534 and a third portion 536. The lid 516 may be secured to the base 314 by a snap fit, threaded fasteners or an adhesive bond, for example. The first portion 532 may include a plurality of first apertures 538 and a second aperture 540. The first apertures 538 may be aligned with the LED's 122 to allow visual access to the LED's 122 while the lid 516 is engaged with the base portion 514. In some embodiments, the LED's 122 may extend through the first apertures 538. The second aperture 540 may be aligned with the reset button 124 of the printed circuit board assembly 110 to allow the user or technician to depress the reset button 124 without removing the lid 516 from the base 514. In some embodiments, the first portion 532 may include an additional aperture that is aligned with the communication port 120 to allow the intelligent device to be connected to the communication port 120 within removing the lid 516 from the base portion 514.

The second portion 534 may be substantially perpendicular to the first portion 532 and may extend inwardly therefrom to engage the cutout 527 in the second wall 520 of the base portion 514. The second portion 534 may include a plurality of third grooves 542 and a fourth groove 544. The third grooves 542 may cooperate with the first grooves 528 in the base portion 514 to engage lead wires 555, 557, 559 that may extend through the cavity 526 from the terminal plug 551. The fourth groove 544 may cooperate with the second groove 530 in the base 514 to engage the wire harness 130 that, as described above, may include a plurality of wires that connect to a corresponding one of the terminals 118 to provide communication between a corresponding one of a plurality of external components and the electrical printed circuit board assembly 110. The third portion 536 may extend outwardly from the first portion 532 to provide clearance for the current transducer 126.

Apart from being integrally formed with the enclosure 512, the terminal plug 551 may be generally similar to the terminal plug 51 described above. The terminal plug 551 may include a base portion 552 and an electrical connector portion 554. The base portion 552 may be integrally formed with the base portion 514 of the enclosure 512. The electrical connector portion 554 may extend from the base portion 552 and removably engage the terminal block 50 of the compressor 10 to provide communication between the wires 555, 557, 559 and the motor assembly 16 of the compressor 10. The wires 555, 557, 559 may extend through the base portion 552 and the first wall 518 and through the enclosure 512. One of the wires 555, 557, 559 may extend through the current transducer 126 to allow the current transducer 126 to measure a current flow therethrough.

Figure 13:
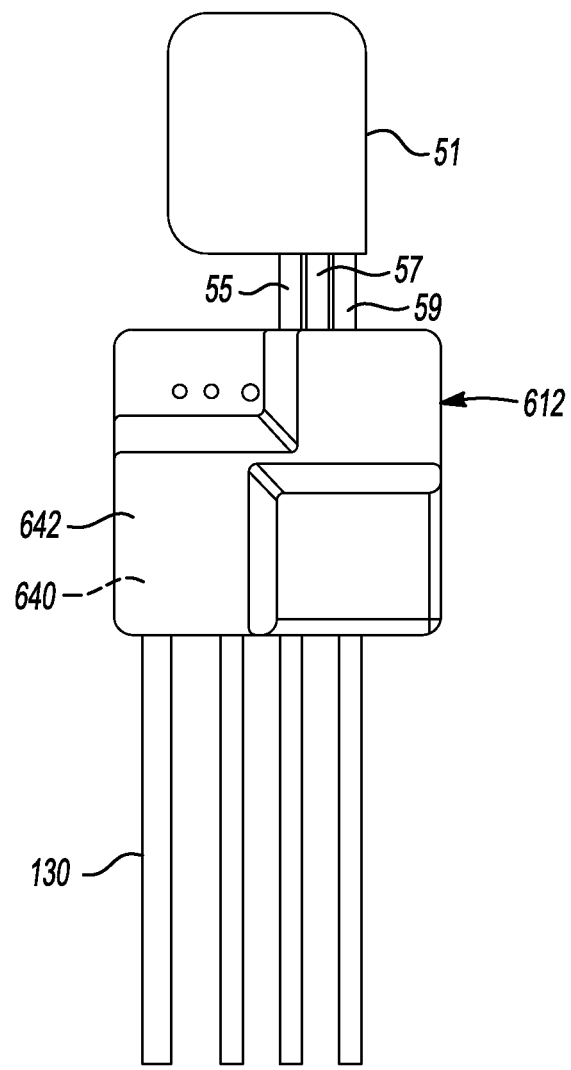
FIG. 13 is a plan view of yet another enclosure for an electrical component according to the principles of the present disclosure.

With reference to FIG. 13, another enclosure 612 is provided that may house the printed circuit board assembly 110 or any other electrical component associated with the compressor 10. The enclosure 612 may include a first portion 640 and a second portion 642 that may be generally similar to the first and second portions 140, 142 of the enclosure 112 apart from any exceptions note below. While the enclosure 112 is described above as including the hinge portion 144, the latch catches 172 and latches 200 to allow for repeated movement of the first and second portions 140, 142 between the open and closed positions, the first and second portions 640, 642 may be formed as separate and discrete components. The printed circuit board assembly 110 may be received in the first portion 640 such that the current transducer 126 extends toward the second portion 640. Then, the first and second portions 640, 642 may be at least partially coated with a layer of a thermoplastic material such as Rynite®, for example, or any other suitable UL® rated polymeric material, to seal the first and second portions 640, 642 in a closed position.

While the enclosures 112, 312, 412, 512, 612 are described above as housing the printed circuit board assembly 110 for a diagnostic device, in some embodiments, the enclosures 112, 312, 412, 512, 612 may house any other electrical system or component associated with the compressor 10 and/or the heat pump or refrigeration system into which the compressor 10 is incorporated. Furthermore, while the compressor 10 is described above as being a scroll compressor, in some embodiments, the compressor 10 could be any other type of compressor such as a reciprocating compressor or a swash plate compressor, for example.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electrical component enclosure for a compressor, the electrical component enclosure comprising:
    a base including an aperture extending through a surface facing a shell of the compressor; and
    a lid engaging said base and cooperating with said base to define an electrical component housing;
    wherein said aperture is operable to engage a fence that at least partially surrounds a terminal block of the compressor so that said fence extends at least partially through and engages said aperture, so that said base is hanging from said fence, said fence extends outward from said shell and surrounds tips of conductor pins of the terminal block, said tips of said conductor pins are disposed outside of said shell; and
    wherein said lid is spaced apart from said fence and said aperture such that a plug is able to be connected to and disconnected from said conductor pins outside of said shell without moving said lid.

2. The electrical component enclosure of claim 1, further comprising an electrical component disposed within said electrical component housing.

3. The electrical component enclosure of claim 2, further comprising a potting material at least partially coating the electrical component.

4. The electrical component enclosure of claim 2, wherein said electrical component includes an indicator light extending through an aperture in said lid.

5. The electrical component enclosure of claim 2, wherein the electrical component includes a current transducer.

6. The electrical component enclosure of claim 1, wherein said lid includes a latch removably engaging said base.

7. The electrical component enclosure of claim 1, further comprising a magnet coupled to said base and securing said base to said shell.

8. The electrical component enclosure of claim 1, wherein said lid includes a wire guide disposed on an outer surface thereof.

9. The electrical component enclosure of claim 1, further comprising a wire in communication with the compressor and extending through an opening in said lid.

10. The electrical component enclosure of claim 9, further comprising a tubular member engaging said opening in said lid, said wire extending through said tubular member.

11. The electrical component enclosure of claim 1, wherein said base removably engages said fence.

12. The electrical component enclosure of claim 1, wherein said electrical component housing is disposed entirely outside of said aperture in said base.

13. A compressor comprising:
a shell including a fence and a terminal block having conductor pins, said conductor pins having tips disposed outside of the shell, said fence surrounding said tips;
a compression mechanism disposed within said shell;
a motor disposed within said shell and driving said compression mechanism;
a plug removably engaging said terminal block such that said fence surrounds a portion of said plug, said plug in communication with said motor via said terminal block; and
an electrical component enclosure including:
a base including an aperture extending through a surface facing said shell, said fence and said plug extending through said aperture such that said base is hanging from said fence; and
a lid engaging said base and cooperating with said base to define an electrical component housing.

14. The compressor of claim 13, further comprising an electrical component disposed within said electrical component housing.

15. The compressor of claim 14, further comprising a potting material at least partially coating the electrical component.

16. The compressor of claim 15, wherein said electrical component includes an indicator light extending through an aperture in said lid.

17. The compressor of claim 15, wherein the electrical component includes a current transducer.

18. The compressor of claim 15, wherein said lid includes a latch removably engaging said base.

19. The compressor of claim 18, wherein said lid includes a wire guide disposed on an outer surface thereof.

20. The compressor of claim 19, further comprising a wire in communication with the motor and extending through an opening in said lid.

21. The compressor of claim 20, further comprising a tubular member engaging said opening in said lid, said wire extending through said tubular member.

22. The compressor of claim 21, further comprising a magnet coupled to said base and securing said base to said shell.

* * * * *